United States Patent Office 3,424,694
Patented Jan. 28, 1969

---

3,424,694
MIXTURE OF SURFACE-ACTIVE COMPOUNDS
AND PROCESS FOR PREPARING SAME
Werner Stein, Erkrath-Unterbach, and Horst Baumann and Manfred Voss, Hilden, Rhineland, Germany, assignors to Henkel & Cie., G.m.b.H., Dusseldorf-Holthausen, Germany, a corporation of Germany
No Drawing. Filed July 15, 1964, Ser. No. 382,930
Claims priority, application Germany, Jan. 30, 1964,
H 51,535
U.S. Cl. 252—355    12 Claims
Int. Cl. C11d 1/37, 1/12, 1/14

---

ABSTRACT OF THE DISCLOSURE

The present invention relates to a process for the preparation of mixtures of surface-active compounds containing sulfonates and sultone reaction products by reacting a non-α-olefin with from 1 mol to 1.7 mols of gaseous sulfur trioxide at a temperature below 70° C., neutralizing the crude sulfonation mixture with from 50% to 95%, based on the amount of sulfur trioxide reacted, of an alkaline neutralization agent, reacting the sultones present in the partially neutralized mixture with a sultone-reacting reagent, bleaching the mixture and recovering said mixture.

---

In the copending, commonly assigned U.S. patent application Ser. No. 382,925 filed concurrently herewith, a process is described for the production of a mixture of surface-active compounds which comprises the steps of reacting an α-olefin having the formula $$R_3R_2R_1C-CH_2-CH=CH_2$$

wherein $R_1$, $R_2$ and $R_3$ are selected from the group consisting of hydrogen and aliphatic hydrocarbon, said olefin containing from 8 to 22 carbon atoms, with from about 1 mol to about 1.7 mols of gaseous sulfur trioxide at a temperature below 70° C., reacting the crude sulfonation mixture with a sultone-reacting reagent, and recovering said mixture of surface-active compounds.

In this process not only the sultones present in the mixture and formed by reaction of $SO_3$ with the olefin are reacted, but also other sulfonic acid products resulting from the sulfonation are reacted. In many cases, compounds are formed thereby which give especially valuable characteristics to the mixture of the surface-active compounds.

It is an object of the present invention to produce a mixture of surface-active compounds having improved surface-active characteristics by reacting a non-α-olefin having from 8 to 22 carbon atoms, with from about 1 mol to about 1.7 mols of gaseous sulfur trioxide at a temperature below 70° C., reacting the crude sulfonation mixture with a sultone-reacting reagent, and recovering said mixture of surface-active compounds.

Another object of the present invention is the development of a process for the preparation of a mixture of surface active compounds which comprises the steps of reacting an olefin having the formula $$R_1-CH=CH-R_2$$

wherein $R_1$ and $R_2$ are selected from the group consisting of alkyl and cycloalkyl, said olefin containing from 8 to 22 carbon atoms, with from about 1 mol to about 1.7 mols of gaseous sulfur trioxide at a temperature below 70° C., neutralizing the crude sulfonation mixture with from 50% to 95%, based on the amount of sulfur trioxide reacted, of an alkaline neutralization agent, reacting the sultones present in the neutralized sulfonation mixture with a sultone-reacting reagent, and recovering said mixture of surface-active compounds.

A further object of the invention is the obtention of mixtures of surface-active compounds by the process of the invention.

These and other objects of the invention will become more apparent as the description thereof proceeds.

It has been discovered that mixtures of surface-active compounds with valuable characteristics may be obtained from olefins whose double bond does not lie in the α-position by a process similar to that of Ser. No. 382,925. Therefore, the subject of the present application is a process for the preparation of mixtures of surface-active compounds by sulfonation of olefins of the general formula $$R_1-CH=CH-R_2$$

wherein $R_1$ and $R_2$ are identical or different alkyl- or cycloalkyl radicals with a total of 6–20 carbon atoms, with the aid of mixtures of $SO_3$ and inert gases and subsequent neutralization, characterized in that the sulfonation mixture is reacted with substances other than water, which are capable of reacting with sultones.

It is known that sultones react with a large number of alkylating compounds, in particular those containing a reactive hydrogen atom. These compounds are preferably reacted with sultones in form of their salts, in particular in their alkali metal or ammonium salts, or in the presence of an acid-binding agent. Such suitable sultone-reacting compounds are e.g. alcohols, phenols, hydroperoxides, carboxylic acids, primary or secondary amines, imines, carboxylic acid or sulfonic acid amides, carboxylic acid or sulfonic acid imides, oximes, as well as compounds containing SH— groups, such as mercaptans, thio acids, dithio acids, xanthogenic acids, dithiocarbamic acids, trithiocarbonic acids and sulfinic acids. These compounds may contain aliphatic, cycloaliphatic or aromatic substituents. Furthermore, they may contain one or several of the named reactive groups. Also salts of simple inorganic acids, e.g. of hydrohalic acids, thiocyanic acid, thiosulfuric acid and hydrogen sulfide may be reacted with sultones.

Some compounds containing active hydrogen are also capable of being reacted with sultones without requiring the simultaneous presence of an acid-binding agent or without the compound being present in a salt form. Such compounds are thiourea and its nitrogen-substituted derivatives, also sulfonic acid amines and hydrohalic acids. Furthermore, compounds whose reactivity is not predicated on an active hydrogen atom but on an atom transformable into a higher coordination number, may be reacted with sultones, for example, tertiary amines, thioethers and tertiary phosphines.

Since the reaction of the sultones present in the sulfonation mixture is accomplished in the presence of large amounts of foreign substances and, moreover, in many cases in the presence of water, the sultones in the process according to the invention are reacted preferably with such substances, which react rapidly and vigorously. Such substances are amines, in particular trialkylamines containing from 3 to 20 carbon atoms, such as trimethylamine or triethylamine, or tertiary amines containing a long-chain aliphatic radical in the molecule, such as octyldimethylamine or dodecyldimethylamine. Also cycloaliphatic, aromatic and heterocyclic amines are suitable, for example dialkylphenylamines having 8 to 20 carbon atoms, cycloalkylamines having 5–6 carbon atoms, dialkylcycloalkylamines having from 8 to 20 carbon atoms, dicycloalkylamines having 10 to 12 carbon atoms, such as cyclohexylamine, dicyclohexylamine, dimethylcyclohexylamine, aniline, dimethylaniline, pyridine, alkylpyridines, piperidine, N-alkyl piperidines having 7 to 20 carbon atoms, and many others.

Furthermore, alcoholates or phenolates are suitable, particularly the alkali metal alkanolates having from 1 to 22 carbon atoms such as sodium methylate, sodium ethylate, potassium octylate, sodium dodecylate; alkali metal phenolates and substituted phenolates, such as sodium phenolate as well as salts of various substituted phenols such as sodium trichlorophenolate, potassium nonylphenolate and similar ones. Especially rapid is the reaction of the sultones with compounds containing SH— groups. Suitable substances are for instance alkali metal or ammonium salts of mercaptans such as alkanethiols, thiophenols, N-substituted dithiocarbamic acids such as N,N-diethyldithiocarbamic acid, trithiocarbonic acid, mercaptobenzothiazole, 2,5-dimercapto-1,3,4-thiadiazole and many others.

The crude sulfonation mixtures which are reacted with the aforenamed sultone-reacting compounds can be prepared in a simple manner by reacting olefins with 8–22 carbon atoms whose double bond is not in the α-position, with sulfur trioxide in form of mixtures with inert gases.

The non-α-olefins serving as starting materials may be straight-chained or branched and may contain also cycloaliphatic groups. However the olefins must be unsubstituted on the double-bond carbon atoms. The olefins need not be present in pure form. They may be used in the form of technical mixtures which may contain small amounts of paraffins or α-olefins. Suitable for instance, are olefin mixtures of the required chain-length as obtained in the Fischer-Tropsch synthesis or by the catalytic cracking of crude oil. Furthermore, olefins may be used which are obtained by chlorination of hydrocarbons and subsequent dehydrochlorination, also olefins obtained by isomerization of terminal olefins.

The gaseous sulfur trioxide serving as sulfonation agent, is diluted with inert gas, wherein the sulfur trioxide concentration of the gaseous mixture may amount to 1–20 volume percent, preferably 2–10 volume percent. As an inert gas, air or nitrogen are preferable. However, other gases are suitable, such as carbon dioxide or sulfur dioxide. For good results, it is preferable to proceed in such manner that the inert gas is passed through heated oleum or liquid, if necessary, heated sulfur trioxide, or by another method, $SO_3$ is evaporated in an inert gas stream. It is also possible to oxidize sulfur dioxide catalytically to sulfur trioxide, said sulfur dioxide diluted with air or oxygen being obtained by burning of sulfur or by roasting of sulfur-containing material. Such mixtures can be employed directly for the sulfonation reaction. The presence of small amounts of sulfur dioxide does not interfere.

The sulfonation may be accomplished according to well known methods. In the simplest way a stream of gas containing sulfur trioxide is introduced into the olefin to be sulfonated. The sulfonation may be accomplished continuously or intermittently by concurrent or contracurrent flow. As a rule, the sulfonation is accomplished at temperatures below 70° C., preferably between about −10° C. and +60° C. and most effectively at a temperature range of about 10° C. to 45° C.

To obtain an efficient degree of sulfonation, it is expedient to use at least about 1 mol of sulfur trioxide per mol of olefin. Preferably 1.1 to 1.3 mols of sulfur trioxide per mol of olefin are used. A greater excess up to about 1.7 mols of $SO_3$ per mol of olefin can be used if desired.

The crude reaction product may be directly reacted with the sultone-reacting reagents, however, the sulfonation products contain a more or less greater portion of acid reaction products in addition to the sultones. To keep the amount of sultone-reacting reagents as small as possible, it has been found to be advantageous to neutralize the crude sulfonation product prior to reacting with the sultone reagents. In general, about 50% to 95%, preferably 55% to 80%, based on the amount of sulfur trioxide absorbed by the sulfonation mixture of an alkaline reacting neutralization agent is utilized, assuming that for 1 mol of sulfur trioxide, one mol equivalent of the alkaline neutralization agent is required. By varying the amount of alkaline neutralization agent utilized for the neutralization, it is possible to adjust the content of the end product with regard to sultone reaction products as desired.

For the neutralization, it is possible, depending upon the intended use of the end product, to use as alkaline neutralization agents, alkali metal and ammonium hydroxides, in particular sodium or potassium hydroxides; also alkali metal and ammonium carbonates; primary, secondary or tertiary amines, such as alkylamines, for example butylamine; dialkylamines, for example dibutylamine, diethylamine; trialkylamines, for example trimethylamine, triethylamine, tributylamine; alkylolamines, for example propanolamine; dialkylolamines, for example diethanolamine; trialkylolamines, for example triethanolamine; and other bases. These bases may be used in form of aqueous or lower alkanolic solutions. In addition, alkali metal lower alkanolates in suitable organic solvents may be utilized for the neutralization. Specifically preferred are solutions of sodium or potassium lower alkanolates in the respective alcohol, especially methanol or ethanol.

According to the reactivity of the sultone-reacting reagents utilized, the reaction of these materials with the crude sulfonation mixture may be accomplished at room temperature or at elevated temperatures. As a rule, it is advantageous to conduct the reaction at temperatures between about 40° C. and 200° C. Furthermore it is preferable to conduct the reaction under agitation. Generally, the content of sultones and other reactive sulfonic acid esters present in the reaction mixture amounts to about 0.1 to 0.5 mol per mol of starting olefin.

It is advisable to conduct the reaction with the sultone-reacting reagents at elevated temperatures and under constant agitation. The concurrent use of organic solvents or diluents, such as lower alkanols or lower alkanones, is feasible and even advisable when dealing with very viscous products. The presence of water generally does not disturb the reaction.

The bases used for the neutralization may, in some cases, be added simultaneously with the sultone-reacting reagents. For instance, the crude sulfonation products may be reacted with an aqueous or lower alkanolic mixture of an alkali metal hydroxide such as sodium hydroxide and a trialkylamine such as trimethylamine.

To obtain products of a light color, it is usually necessary to subject the mixture of surface-active compounds to a bleaching treatment. For practical reasons this is done after the reaction with the sultone-reacting reagent. The bleaching is conducted with ordinary bleaching agents, such as hydrogen peroxide, sodium hypochlorite or chlorite, generally at temperatures between 20° to 100° C., preferably 40° to 60° C. The amount of the bleaching agent required varies with each case. When working with hydrogen peroxide, as a rule about 0.05 to 10%, preferably 2 to 6% is used, based on the amount of the mixture to be bleached. (The percentages given are based on the weight of anhydrous $H_2O_2$, based on the anhydrous sulfonation product.) The required amount of bleaching agent is best ascertained by a preliminary test.

It has been found especially practical to accomplish the bleaching treatment in neutral to weakly alkaline media using a hypochlorite. The bleaching may be advantageously conducted by introducing chlorine under steady agitation into the alkaline-adjusted reaction product. Especially satisfactory results have been obtained with a 2-step bleaching process; in the first step, the bleaching is done under neutral to weakly acid conditions with hydrogen peroxide, in the second step with hypochlorite or chlorite.

The mixtures of surface-active compounds prepared according to the process of the invention exhibit various characteristics depending on the sultone-reacting reagents used. If an amine, such as dodecyldimethylamine, has been used as the sultone-reacting reagent, the reaction products show an advantageous, foam-stabilizing effect. The use of said reaction mixtures in laundry and cleaning agents gives agents with especially satisfactory foam stability. In other cases, with the employment of sultone-reacting reagents containing sulfur, or sulfur and nitrogen, such as mercaptobenzothiazole or thiourea, the sultone reaction products impart a satisfactory corrosion-inhibiting effect to the mixtures. The reaction with tertiary amines frequently yields compounds having good disinfecting or bacteriostatic properties.

The following specific embodiments are illustrative of the invention. They are, however, not to be deemed limitative. Other expedients known to those skilled in the art, or outlined above, may be employed.

EXAMPLE I 270 g. (1.2 mol) of a straight-chain $C_{16}$-olefin mixture with double bonds statistically distributed over the carbon chain and with a content of less than 10% α-olefin were placed into a 3-neck sulfonation reactor of 2-liter capacity. The sulfonation reactor was provided with a thermometer, a gas inlet tube extending to the bottom of the reactor, a gas outlet and a high-speed agitator. The olefin mixture was sulfonated under vigorous agitation by injecting an $SO_3$ mixture containing approximately 3 volume percent of $SO_3$. Over a period of 1 hour, 112 g. of $SO_3$ (1.4 mols) were introduced thereby. By exterior cooling the temperature of the reaction mixture was maintained at 15–25° C. After complete sulfonation, the reaction product of low viscosity was admixed in small portions, while stirring and cooling, with a solution of 32 g. of NaOH (0.8 mol) in 200 ml. of water (corresponding to 57% of the required NaOH for neutralization, based on absorbed $SO_3$). Next, 100 ml. of a 40% aqueous solution of trimethylamine was added, and the reaction mixture was heated for 1½ hours in an autoclave of 2-liter capacity at 120° C. Then the solution was neutralized by adding a small amount of dilute sulfuric acid and transformed into a dry powder with the aid of a Krause spray dryer at a temperature of 90–100° C.

407 g. of a yellow colored powder were obtained, which was easily soluble in water and yielded intensely foaming solutions.

The reaction product had the following analytical values:

| | |
|---|---|
| Acid No. | 0 |
| Saponification No. | 0 |
| Iodine No. | 29.7 |
| Hydroxyl No. | 29.2 |
| Nitrogen content percent | 1.08 |

Free trimethylamine or trimethylammoniumsulfonate were no longer present in the product. Based on the obtained nitrogen value a content of 28.4% of a trimethylammoniumsulfobetaine in the reaction product was calculated.

With another batch of the same type, the product was bleached prior to the spray drying with sodium hypochlorite. The neutralized solution was heated with 4% (based on the sulfonation product) of NaClO for 2 hours at 50° to 60° C. accompanied by gentle agitation. By this method, a particlly colorless powder was obtained.

EXAMPLE II

In the apparatus as described in Example I, 236 g. (1.2 mols) of a straight-chain $C_{14}$-olefin mixture with double bonds statistically distributed over the carbon chain and with a content of less than 10% α-olefin were sulfonated. For this purpose, 115 g. of sulfur trioxide (1.44 mols) were introduced in form of an $SO_3$ air mixture containing about 3 volume percent of $SO_3$, while vigorously agitating in the course of 1 hour. By exterior cooling the temperature of the reaction mixture was maintained between 10 and 20° C. After complete sulfonation, the reaction product of low viscosity was admixed in small portions, while agitating and cooling, with a solution of 34 g. of NaOH (0.85 mol) in 300 ml. of water (corresponding to 59% of the required NaOH for neutralization, based on the absorbed $SO_3$). Next, the partially neutralized product obtained was admixed in small portions, while stirring at about 40° C., to a solution of 0.6 mol of sodium N,N-diethyldithiocarbamate. This latter solution had been prepared by the reaction of 45.5 g. of carbon disulfide, 43.5 g. of diethylamine and 300 ml. of an 8% sodium hydroxide solution. After this addition, the reaction mixture was refluxed while agitating for a period of 3 hours. Thereafter, the solution was neutralized with dilute sulfuric acid and spray dried in the Krause spray dryer at a temperature of 90–100° C. 452 g. of a solid, yellow powder were obtained, easily soluble in water and yielding intensely foaming solutions.

EXAMPLE III

In the same apparatus as in Example I, 332 g. (1.32 mols) of a straight-chain $C_{18}$-olefin mixture, with double bonds statistically distributed over the carbon chain and with a content of less than 10% of α-olefins, were sulfonated. 126 g. of $SO_3$ (1.58 mols) in form of an $SO_3$ air mixture containing about 3 volume percent of sulfur trioxide were injected into the olefin over the course of 1½ hours while vigorously agitating. By exterior cooling, the temperature of the reaction mixture was maintained between 20–30° C.

After complete sulfonation the sulfonation reaction product of low viscosity was admixed in small portions, while cooling and stirring, with a solution of 36.4 g. of NaOH (0.91 mol) in 200 ml. of water. The partially neutralized mixture obtained was admixed in small portions, while stirring at a temperature of about 40° C., to a solution of 131 g. of 2,4,6-trichlorophenol (0.67 mol) in 330 ml. of an 8% sodium hydroxide solution. Then the vigorously foaming reaction mixture was refluxed while agitating for 5 hours. Next, the solution was neutralized with dilute sulfuric acid and transformed into a dry powder in the Krause spray dryer at a temperature of 100° C. 608 g. of a yellow colored powder were thus obtained, easily soluble in water and yielding vigorously foaming solutions.

With another batch of the same type, the sulfonation product, partially neutralized with sodium hydroxide, was reacted with sodium 2,4,6-trichlorophenolate by heating in an autoclave over a period of 2 hours at 130° C. A product was obtained which was practically identical with the precedingly described.

The proceding specific embodiments are illustrative of the invention. It is to be understood that other expedients, as described or as known to those skilled in the art, may be employed without departing from the spirit of the invention or the scope of the appended claims.

We claim:

1. A process for the preparation of a mixture of surface-active compounds which comprises the steps of reacting an olefin having the formula

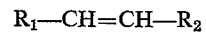

$$R_1\text{—}CH\text{=}CH\text{—}R_2$$

wherein $R_1$ and $R_2$ are selected from the group consisting of alkyl and cycloalkyl, said olefin containing from 8 to 22 carbon atoms, with from about 1 mol to about 1.7 mols of gaseous sulfur trioxide at a temperature below 70° C., neutralizing the crude sulfonation mixture consisting essentially of a mixture of sulfonic acids and sultones with from 50% to 95% based on the amount of sulfur trioxide reacted, of an alkaline neutralizing agent to give a neutralized sulfonation mixture consisting essentially of from 0.9 to 0.5 mol per mol of starting olefin of neutralized sulfonic acids and from 0.1 to 0.5 mol per mol of starting olefin of sultones, reacting the sultones present in the neutralized sulfonation mixture with a sultone-reacting reagent selected from the group consisting of amines, alkali metal alkanolates, alkali metal phenolates, organic compounds containing a thiol group and thioureas, bleaching the mixture of surface-active compound, and recovering said mixture of surface-active compounds.

2. The process of claim 1 wherein said bleaching is effected by the action of an alkali metal hypochlorite.

3. The process of claim 1 wherein said bleaching is effected by alkalinizing the mixture of surface-active compounds and introducing chloride therein.

4. The process of claim 1 wherein said bleaching is effected by the action of hydrogen peroxide on the neutral to weakly acid mixture of surface-active compounds and thereafter by the action of an alkali metal hypochlorite.

5. The mixture of surface-active compound produced by the process of claim 1.

6. A process for the preparation of a mixture of surface-active compounds which comprises the steps of reacting an olefin having the formula

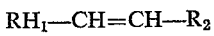

wherein $R_1$ and $R_2$ are selected from the group consisting of alkyl and cycloalkyl, said olefin containing from 8 to 22 carbon atoms, with from about 1 mol to about 1.7 mols of gaseous sulfur trioxide at a temperature below 70° C., neutralizing the crude sulfonation mixture consisting essentially of sulfonic acids and sultones with from 50% to 95% based on the amount of $SO_3$ reacted, of a neutralization agent selected from the group consisting of ammonium hydroxide, alkali metal hydroxides, alkali metal carbonates, alkylamines, dialkylamines, trialkylamines, alkylolamines, dialkylolamines, trialkylolamines and alkali metal lower alkanolates to give a neutralized sulfonation mixture consisting essentially of from 0.9 to 0.5 mol per mol of starting olefin of neutralized sulfonic acids and from 0.1 to 0.5 mol per mol of starting olefin of sultones, reacting the sultones present in the neutralized sulfonation mixture with a solutone-reacting reagent selected from the group consisting of amines, alkali metal alkanolates, alkali metal phenolates, alkali metal substituted phenolates, organic compounds containing a thiol group and thioureas, bleaching the mixture of surface-active compounds, and recovering said mixture of surface-active compounds.

7. The process of claim 6 wherein said neutralization is conducted in an inert solvent.

8. The process of claim 6 wherein said reaction with a sultone-reacting reagent is conducted in the presence of a solvent selected from the group consisting of water and inert organic solvents at a temperature from about room temperature to about 200° C.

9. The process of claim 6 wherein said sultone-reacting reagent is a trialkylamine.

10. The process of claim 6 wherein said alkaline neutralization agent and said sultone-reacting reagent are added simultaneously.

11. The process of claim 6 wherein said sultone-reacting reagent is added in an amount sufficient to react with all sultones present in said neutralized sulfonation mixture.

12. A process for the preparation of a mixture of surface-active compounds which comprises the steps of reacting an olefin having the formula

wherein $R_1$ and $R_2$ are selected from the group consisting of alkyl and cycloalkyl, said olefin containing from 8 to 22 carbon atoms, with from about 1 mol to about 1.7 mols of gaseous sulfur trioxide at a temperature below 70° C., neutralizing the crude sulfonation mixture consisting essentially of a mixture of sulfonic acids and sultones with from 50% to 95% based on the amount of $SO_3$ reacted, of an aqueous alkali metal hydroxide to give a neutralized sulfonation mixture consisting essentially of from 0.9 to 0.5 mol per mol of starting olefin of alkali metal sulfonates and from 0.1 to 0.5 mol per mol of starting olefin of sultones, recating the sultones present in the neutralized sulfonation mixture with a sultone-reacting reagent selected from the group consisting of amines, alkali metal alkanolates, alkali metal phenolates, alkali metal substituted phenolates, organic compounds containing a thiol group and thioureas, bleaching the mixture of surface-active compounds at a temperature of from about 40° C. to about 200° C., and recovering said mixture of surface-active compounds.

References Cited

UNITED STATES PATENTS

| 2,875,125 | 2/1959 | Gaertner | 260—327 |
| 3,109,846 | 11/1963 | Klass et al. | 260—294.8 |
| 3,164,608 | 1/1965 | Blaser | 260—327 |
| 3,200,127 | 8/1965 | Klass | 260—327 |
| 3,235,549 | 2/1966 | Broussalian | 260—513 |
| 3,255,240 | 6/1966 | Wolfram et al. | 260—294.8 |

OTHER REFERENCES

Bordwell et al.: J. Am. Chem. Soc., vol. 76, pp. 3952–3956.

LEON D. ROSDOL, *Primary Examiner.*

RICHARD D. LOVERING, *Assistant Examiner.*

U.S. Cl. X.R.

252—161; 260—293.47, 294.8, 327, 501.12, 513